United States Patent
Drossel

(10) Patent No.: US 11,485,181 B2
(45) Date of Patent: Nov. 1, 2022

(54) TROLLEY FOR USE AS A BICYCLE TRAILER OR AS A HAND CART

(71) Applicant: CHAL-TEC GMBH, Berlin (DE)

(72) Inventor: Benjamin Drossel, Berlin (DE)

(73) Assignee: CHAL-TEC GMBH

( * ) Notice: Subject to any disclaimer, the term of this patent is extended or adjusted under 35 U.S.C. 154(b) by 0 days.

(21) Appl. No.: 17/125,239

(22) Filed: Dec. 17, 2020

(65) Prior Publication Data

US 2021/0188025 A1 Jun. 24, 2021

(30) Foreign Application Priority Data

Dec. 19, 2019 (DE) .......................... 102019135039.5
Dec. 19, 2019 (DE) .......................... 102019135040.9

(51) Int. Cl.
*B60D 1/54* (2006.01)
*B62K 27/00* (2006.01)
(Continued)

(52) U.S. Cl.
CPC .................. *B60D 1/54* (2013.01); *B62B 1/00* (2013.01); *B62B 1/12* (2013.01); *B62B 5/06* (2013.01);
(Continued)

(58) Field of Classification Search
CPC ...... B62D 63/08; B62K 27/003; B62K 27/12; B62B 5/0079; B62B 5/066; B60D 1/54;
(Continued)

(56) References Cited

U.S. PATENT DOCUMENTS 3,792,875 A * 2/1974 Paden .................. B62K 27/003
280/204
4,789,171 A * 12/1988 Porter ...................... B62B 1/20
280/47.18
(Continued)

FOREIGN PATENT DOCUMENTS

DE 20 2006 011900 11/2006
DE 202006011900 U1 * 11/2006 ........... B62D 63/064
(Continued)

OTHER PUBLICATIONS https://www.youtube.com/watch?v=7XGcFsNVpfg, Introducing the new Fourmi transport trailer, Dec. 18, 2019.
(Continued)

*Primary Examiner* — Kevin Hurley
*Assistant Examiner* — Hosam Shabara
(74) *Attorney, Agent, or Firm* — Gardner Groff & Greenwald, PC

(57) ABSTRACT

The present invention relates to a cart (1) for use as a bicycle trailer (1) or as a handcart (1) with a frame (10) with a pair of wheels (13) and with a loading surface (14) and with a foldable drawbar (3) with a drawbar body (33) which is designed to be connected to a bicycle in a first position and to be guided by a user's hand in a second position. The cart (1) is characterized in that the foldable drawbar (3) has a drawbar holder (30) arranged on the frame (10), the drawbar holder (30) being designed with the draw-bar body (33) in the first position and in the second position. The present invention also relates to a cart (1) for use as a bicycle trailer (1) or as a handcart (1) with a frame (10) with a pair of wheels (13) and with a loading surface (14) and with a fold-out stand (2). The cart (1) is characterized in that the fold-out stand (2) has a stand holder (20) which is arranged on the frame (10) and a stand element (24) which is held in a foldable manner by the stand holder (20), the stand holder
(Continued)

(20) having a recess (21) within which the stand element (24) can be hinged between a folded state and an unfolded state.

22 Claims, 18 Drawing Sheets

(51) Int. Cl.
| | | |
|---|---|---|
| *B62D 63/08* | (2006.01) | |
| *B62B 5/06* | (2006.01) | |
| *B62B 1/12* | (2006.01) | |
| *B62K 27/12* | (2006.01) | |
| *B62B 5/00* | (2006.01) | |
| *B62B 1/00* | (2006.01) | |
| *B60D 1/00* | (2006.01) | |

(52) U.S. Cl.
CPC ............. *B62B 5/066* (2013.01); *B62D 63/08* (2013.01); *B62K 27/003* (2013.01); *B62K 27/12* (2013.01); *B60D 2001/003* (2013.01); *B60D 2001/006* (2013.01); *B60D 2001/548* (2013.01); *B62B 5/0079* (2013.01)

(58) Field of Classification Search
CPC ........ B60D 2001/003; B60D 2001/006; B60D 2001/548
USPC ........................................................ 280/204
See application file for complete search history.

(56) References Cited

U.S. PATENT DOCUMENTS

| | | | | |
|---|---|---|---|---|
| 8,814,193 | B2 * | 8/2014 | Barnes | ................... B62K 27/12 |
| | | | | 280/204 |
| 9,669,859 | B2 * | 6/2017 | Hansen | ................... B62B 7/044 |
| 11,142,278 | B2 * | 10/2021 | Van Leeuwen | ........ B62K 27/12 |
| 2006/0207831 | A1 * | 9/2006 | Moore | ................ A01M 31/006 |
| | | | | 182/20 |

FOREIGN PATENT DOCUMENTS

| | | | | |
|---|---|---|---|---|
| DE | 20 2006 008175 | | 12/2006 | |
| DE | 202006008175 | U1 * | 12/2006 | ........... B62K 27/003 |
| DE | 20 2013 006204 | | 7/2013 | |
| DE | 202013006204 | U1 * | 7/2013 | ............... B62B 1/12 |
| FR | 3094921 | A1 * | 10/2020 | ............. B60D 1/665 |

OTHER PUBLICATIONS

Assembly instruction of Vitelli-Camping, Mar. 4, 2007.
Homemade Bike Trailer (D5), https://web.archive.org/web/20150214160642/https://alleweder-116.de/cms/fahrradanhaenger.txt, Feb. 14, 2015.
Price list of the company Hinterher.com (D6), https://www.hinterher.com/service/Hinterher-Preisliste-VK-netto+brutto-07-2020_0.pdf?m=1597675445&, 2018.
Extracts of D5 and of D6 with comments of the examiner of the German PTO.

* cited by examiner

TROLLEY FOR USE AS A BICYCLE TRAILER OR AS A HAND CART

The present invention relates to a cart for use as a bicycle trailer or as a handcart according to the preamble of claim 1 and a cart for use as a bicycle trailer or as a handcart according to the preamble of claim 8.

In order to increase the possibilities and in particular the capacities when transporting loads by means of a bicycle, it is known to use so-called bicycle trailers. These are usually single-track or two-track trailers, which are arranged behind the bicycle and connected to the bicycle on the side or above the rear wheel. Depending on the type of bicycle trailer and the application, objects such as cardboard boxes, pieces of luggage, packages and the like, but also children or dogs, for example, can be transported as loads.

For transporting such loads it is possible to use, in particular, two-track load trailers which usually have two wheels connected in the transverse direction by means of a common axle. A frame which can also be referred to as a framework or a support structure is arranged in the vertical direction above the axle and rotatably connected to the axle. The frame usually forms a flat loading surface on which the loads to be transported can be arranged. If necessary, brackets projecting in the vertical direction can be arranged on the edge of the loading surface at the side, rear and/or front to hold and secure the loads during transport.

A drawbar which, depending on the design and application, is shaped to be connected to the bicycle laterally in the transverse direction or in the vertical direction above the rear wheel, is also provided on the frame. Lateral fastening by means of a so-called low drawbar is usually carried out in the region of the hub of the rear wheel and usually on the left in the direction of travel. Fastening above the rear wheel by means of a so-called high drawbar usually takes place over the luggage rack in the region of the clamping of the saddle support. In any case, a trailer coupling is permanently mounted on the bicycle for this purpose, and can then be connected to a corresponding coupling element on the end of the drawbar facing away from the frame.

DE 20 2013 006 204 U1 describes a multifunctional cart comprising a support structure having two wheels and a loading surface and a first receiving device formed on the support structure for releasably fastening a drawbar for coupling to a bicycle. In the fastened state, a region of the drawbar is guided as a fastening region in the first receiving device. A second receiving device for detachable fastening of the drawbar is arranged on the support structure. The second receiving device is provided on the support structure at a distance in the transverse direction next to the first receiving device. The second receiving device is designed in the form of two openings made in the support structure and designed to correspond to the cross-sectional shape of the fastening region. The openings of the second receiving device are arranged and aligned with one another in such a way that, in the fastened state, the fastening region of the drawbar is oriented at an acute angle to the loading surface.

An object of the present invention is to provide a cart for use as a bicycle trailer or as a handcart of the type described at the outset, the usability of which as a bicycle trailer and/or as a handcart can be improved for a user and/or can be changed by the user more easily and/or more quickly than previously known. In particular, the effort, the installation space and/or the costs of the receiving devices of the support structure should be reduced. In particular, the effort, the installation space and/or the costs of a fold-out stand should be reduced. At least one alternative to known carts of this type should be created.

According to the invention, the object is achieved, on the one hand, by a cart with the features of claim 1. Advantageous developments are described in the dependent claims.

Thus, the present invention relates to a cart for use as a bicycle trailer or as a handcart having a frame with a pair of wheels and with a loading surface. The wheels are preferably connected by means of a common axle in the transverse direction so that a two-track cart can be created. An embodiment with only one axle with one pair of wheels can also be referred to as a truck or hand truck. However, two axles each having a pair of wheels can be used.

The cart has a foldable drawbar with a drawbar body which is designed to be connected to a bicycle in a first position and to be guided by a user's hand in a second position. Folding is understood to mean a movement by means of which the drawbar body can be folded between the two positions by the user. This can also be referred to as pivoting or turning and takes place at least substantially around the longitudinal axle of the cart.

The cart according to the invention is characterized in that the foldable drawbar has a drawbar holder arranged on the frame, the drawbar holder being designed to receive the drawbar body in the first position and in the second position. In other words, the same drawbar holder can be used to receive and thus hold the drawbar body in both positions.

According to the invention, two separate receiving devices as drawbar holders such as are known from DE 20 2013 006 204 can be dispensed with in this way. This can simplify the change between the two positions of the drawbar body for the user. In particular, the effort required to hold the drawbar body in both positions can be reduced by dispensing with a second receiving device. This can reduce the cost of the cart in terms of material and/or assembly. This can also reduce the necessary installation space on the frame, since only one drawbar holder has to be arranged there. This can also be beneficial for the visual impression of the cart for a user. The single drawbar holder can preferably be arranged centrally in the transverse direction and thus on the axis of symmetry, which can also improve the visual impression of the cart for the user. This can also improve or increase the design options of the cart, since only one drawbar holder has to be designed and/or arranged.

The drawbar body can be received in both positions, in particular, by turning the drawbar body by approximately 90° and by changing the orientation of the drawbar body relative to the horizontal, as will be described below as a preferred implementation option.

However, this can also take place by other suitable measures which lead to the implementation of these features. For example, the drawbar body can be telescopically pulled out of the drawbar holder and then pivoted around, for example via a hinge which can also be designed, for example, around a retaining pin. It could also be possible to receive the drawbar body via a plug-in/latching mechanism within the drawbar holder. However, such measures could be more complex in terms of design and/or manufacturing technology.

According to one aspect of the present invention, the drawbar holder is designed to receive the drawbar body in the first position at least substantially horizontally and in the second position obliquely with respect to the horizontal pointing upwards in the vertical direction. An oblique orientation to the horizontal can also be understood to mean an orientation at an acute angle to the loading surface, as in DE 20 2013 006 204 U1.

This allows a suitable orientation of the drawbar body with respect to the frame in the first position in order to fasten the drawbar body to a bicycle, in particular as a low drawbar, and thus to be able to use the cart as a bicycle cart in the first position of the drawbar body. Similarly, in the second position, a suitable orientation of the drawbar body with respect to the frame can be made possible in order to make the drawbar body accessible for a user's hand, so that the cart can be used as a handcart or hand truck in this second position of the drawbar body.

According to a further aspect of the present invention, the drawbar holder has a horizontal receiving region which is designed to receive a fastening region of the drawbar body in the first position, and the drawbar holder has an oblique receiving region which is designed to receive the fastening region of the drawbar body in the second position. This can favor the arrangement of the drawbar body in the two positions as described above. In particular, both positions of the drawbar body can be assumed with respect to the same drawbar holder, so that both positions and thus the use of the cart according to the invention can be made possible both as a bicycle trailer and as a handcart or hand truck with only one drawbar holder.

According to a further aspect of the present invention, the drawbar holder, preferably a horizontal receiving region of the drawbar holder, has at least one pair of through-openings which, in the first position of the drawbar body, are designed to be connected by means of a connecting element to a pair of horizontal through-openings in the drawbar body, preferably in a fastening region of the drawbar body. The two through-openings of the pair are preferably diametrically opposite one another with regard to the drawbar body.

This can offer a simple, flexible and/or inexpensive possibility of a connection between the drawbar body and the drawbar holder. In particular, for the user this connection can be simple and/or quick to establish and to undo, which can favor and/or accelerate the change in use of the vehicle according to the invention both as a bicycle trailer and as a handcart or hand truck. As a result, the changing use of the cart according to the invention can be more attractive to the user and therefore can also be used frequently. Bolts, screws and the like, for example, can be used as the connecting element, and can be secured, for example, by locking pins, nuts and the like.

According to a further aspect of the present invention, the drawbar holder, preferably an oblique receiving region of the drawbar holder, has at least one pair of through-openings which, in the second position of the drawbar body, are designed to be connected by means of a connecting element to a pair of vertical through-openings in the drawbar body, preferably in a fastening region of the drawbar body. As a result, the properties and advantages described above can also be applied to the second position of the drawbar body.

According to a further aspect of the present invention, the drawbar holder has at least one pair of through-openings which, in the first position of the drawbar body, are designed to be connected by means of a connecting element to a pair of horizontal through-openings in the drawbar body, preferably in a fastening region of the drawbar body, and, in the second position of the drawbar body, are designed to be connected by means of a connecting element to a pair of vertical through-openings in the drawbar body, preferably in a fastening region of the drawbar body. In other words, the same pair of through-openings of the drawbar holder can be used in order to be connected to different through-openings of the drawbar body in both positions of the drawbar body and thus to hold the latter. This can minimize the effort and in particular the installation space of the drawbar holder.

In each case of a connection between the drawbar holder and the drawbar body through the corresponding through-openings described above, the stability of the connection can be increased by using two pairs of through-openings in each case on the drawbar holder and on the drawbar body in at least one of the two positions and preferably in both positions, each pair of through-openings being connected to one another by a connecting element. This can in particular prevent the drawbar body from rotating with respect to the drawbar holder around the one connecting element as the axis of rotation, which can noticeably increase the stability of the connection, particularly for the user. This can also increase the user's confidence in the use of the cart according to the invention both as a bicycle trailer and as a handcart or hand truck.

According to a further aspect of the present invention, the connecting element is designed to secure itself. For this purpose, for example, a latching mechanism or the like can be provided on the connecting element and can latch into place and can hold the connecting element automatically when the connecting element is guided through the corresponding through-openings of the drawbar body and the drawbar holder. An additional securing element such as, for example, a securing pin and the like can also be provided, is introduced transversely to the connecting element into the end thereof, and protrudes beyond the drawbar holder after the introduction of the connecting element through the corresponding through-openings in the drawbar body and the drawbar holder. Such a connecting element can be, for example, a bolt, which can keep the implementation simple, secure and inexpensive. Alternatively, the end of the connecting element projecting beyond the drawbar holder can also be held by means of a clamping element, such as, for example, by means of a locking ring, and the connecting element can be held and secured thereby.

On the other hand, according to the invention the object is achieved by a cart having the features of claim 8. Advantageous developments are described in the dependent claims.

Thus, the present invention relates to a cart for use as a bicycle trailer or as a handcart having a frame with a pair of wheels and with a loading surface and with a fold-out stand. The wheels are preferably connected by means of a common axle in the transverse direction so that a two-track cart can be created. An embodiment with only one axle with one pair of wheels can also be referred to as a truck or hand truck. However, two axles each having a pair of wheels can be used.

The fold-out stand has a stand holder which is arranged on the frame and a stand element which is held foldably by the stand holder, the stand holder having a recess within which the stand element can be hinged between a folded state and an unfolded state.

This makes it possible to support the cart both as a bicycle trailer and as a handcart or as a hand truck on the unfolded stand element, which can be set up on a surface for this purpose. This can increase the convenience of use for the user. This possibility can be made available to the user particularly easily, quickly and/or conveniently by folding. It can be implemented in a technically or mechanically simple and correspondingly inexpensive, durable manner and/or in a space-saving manner.

The stand element is preferably unfolded in the longitudinal direction and in particular along the longitudinal axis as the axis of symmetry of the cart in the transverse direction. This can make the stand element equally easily accessible to the user for folding in and/or for unfolding from both sides of the cart in the transverse direction.

Additionally or independently of this, the stand element can preferably be arranged in the longitudinal direction in front of the two wheels. In this way, a secure stand can be created, since the center of gravity of such carts is usually located in front of the two wheels and thus can be supported relative to the ground by the stand element arranged there.

In any case, the fold-out stand and in particular its stand element are designed to hold the cart and in particular its loading surface at least substantially horizontally in the unfolded state. This can favor the use of the cart and in particular the use of the loading surface of the cart for the user.

According to a further aspect of the present invention, the recess is delimited by two recess ends and the recess has a recess constriction between the two recess ends, preferably in the middle. In other words, the recess narrows between the two recess ends, so that the two recess ends are preferred positions for the stand element. The stand element is pressed, so to speak, by the recess constriction along the longitudinal extent of the recess towards one of the two recess ends. This can favor the safe and automatic positioning of the stand element at one of the two recess ends. In particular, the stand element can be held at the relevant recess end, and thus in the corresponding position, by the recess constriction.

According to a further aspect of the present invention, the stand element is designed to deflect transversely to the folding direction when the stand element is folded between the folded-in state and the unfolded state. This can make it easier to move the stand element away over the recess constriction. This also allows the stand element to be held at the relevant end of the recess. Due to the interaction of the resilient stand element and the recess constriction, this can be implemented in a particularly simple, cost-effective, robust and/or space-saving manner.

According to a further aspect of the present invention, the stand element has two open ends which each engage in a corresponding through-opening of the stand holder in such a way that the stand element is held rotatably in the through-openings of the stand holder. As a result, the folding, rotating or pivoting of the stand element relative to the stand holder can be implemented in a particularly simple, cost-effective, robust and/or space-saving manner.

According to a further aspect of the present invention, the loading surface has laterally in the transverse direction in each case an edge protruding upward in the vertical direction. From the edge, loads such as, in particular, objects such as cardboard boxes, packages and the like can be held simply and effectively on the loading surface at least in the lateral direction. At the same time, allowing the edge or a further edge at the front and/or rear end of the loading surface also to project upward in the vertical direction in a longitudinal direction can also provide these properties in the longitudinal direction. Alternatively, designing the loading surface at the front and/or rear end without an edge in a longitudinal direction can facilitate or simplify loading and/or unloading in the longitudinal direction.

According to a further aspect of the present invention, the edges of the loading surface each have at least one holder, preferably a through-opening, which is designed to be used to hold loads arranged on the loading surface. This can enable or facilitate the securing of loads arranged on the loading surface, for example by means of ropes, straps, bands, belts and the like, by pulling the ropes etc. preferably through the through-openings and preferably guiding them over the loads and/or around the loads and, for example, tying them at the edges and/or to one another. This can favor the use of ropes etc. to secure loads on the loading surface of the cart.

According to a further aspect of the present invention, the drawbar body has a coupling element at its end facing away from the frame, which coupling element is designed to be connected to a bicycle in the first position of the drawbar body. This can enable or facilitate the use of the cart as a bicycle trailer.

According to a further aspect of the present invention, the drawbar body has, in the region of its end facing away from the frame, a grip region which is designed to be gripped by one hand of a user in the second position of the drawbar body. This can enable or facilitate the use of the cart as a handcart or hand truck.

An embodiment and further advantages of the invention are illustrated purely schematically and explained in greater detail below in connection with the following figures. In the figures:

FIG. 16 is a perspective schematic representation of a fold-out stand with the stand element folded in;

Figure 1:
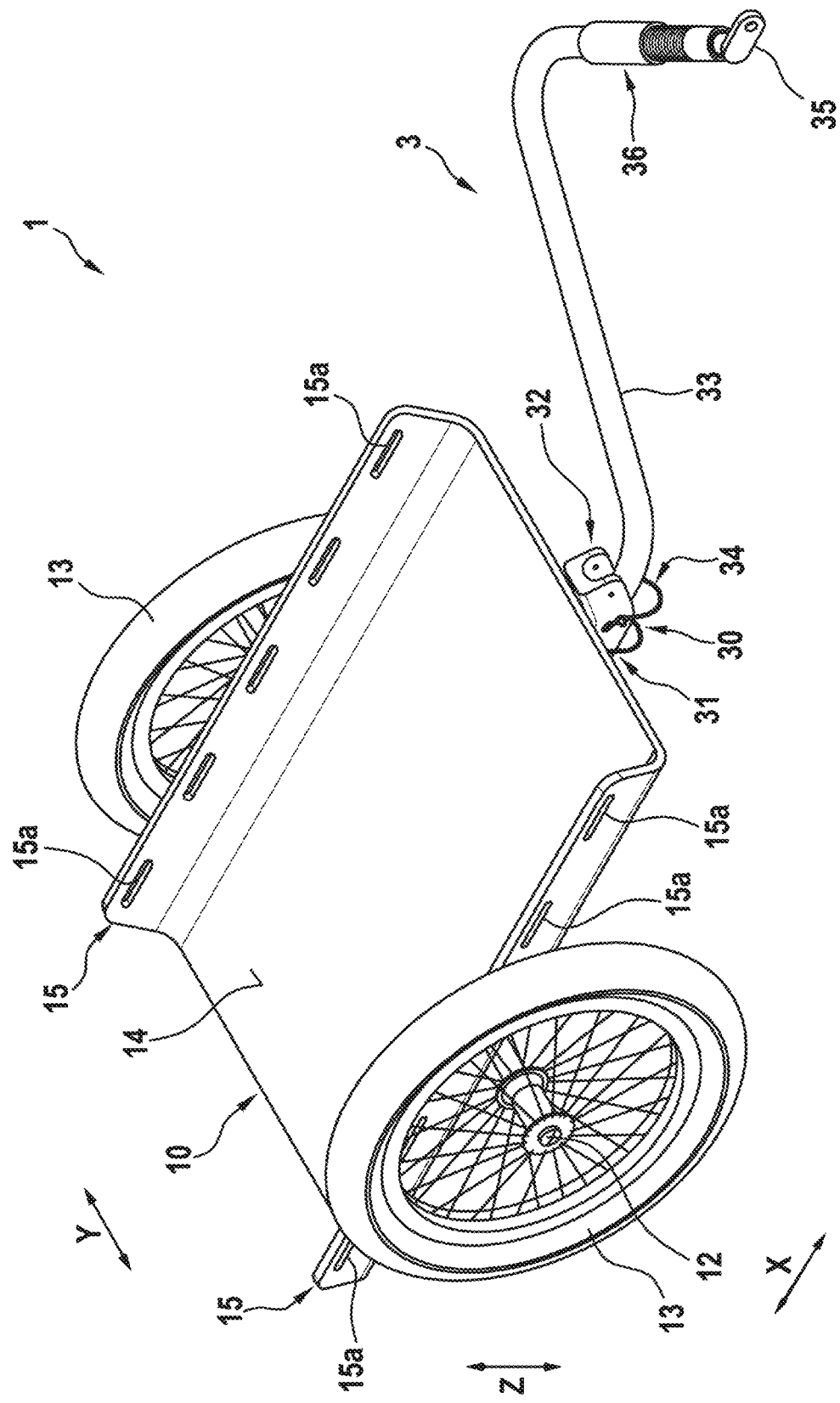
FIG. 1 is a perspective schematic representation of a cart according to the invention in a first position as a bicycle trailer.
Figure 2:
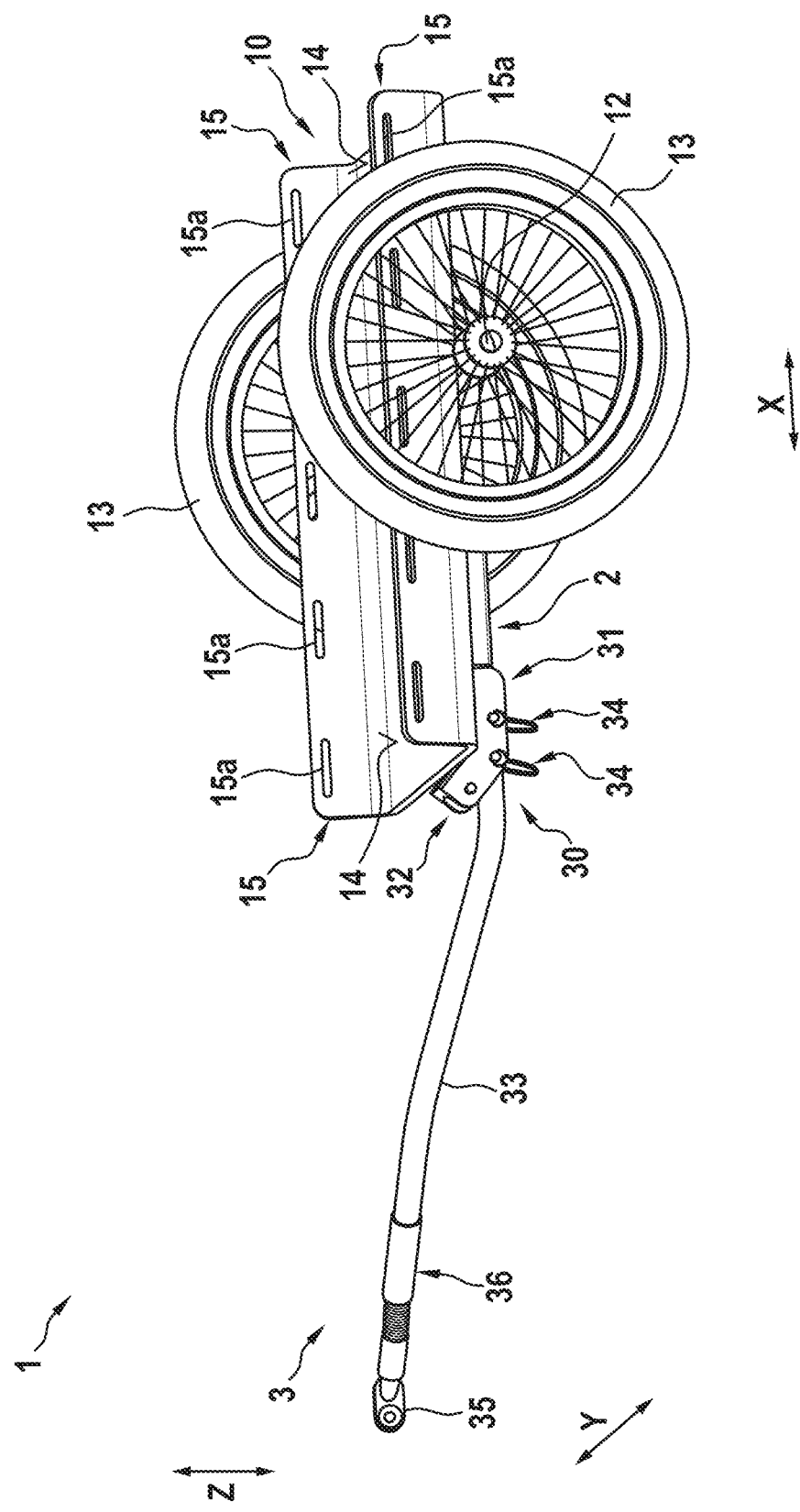
FIG. 2 is a further perspective schematic representation of the cart of FIG. 1.
Figure 3:
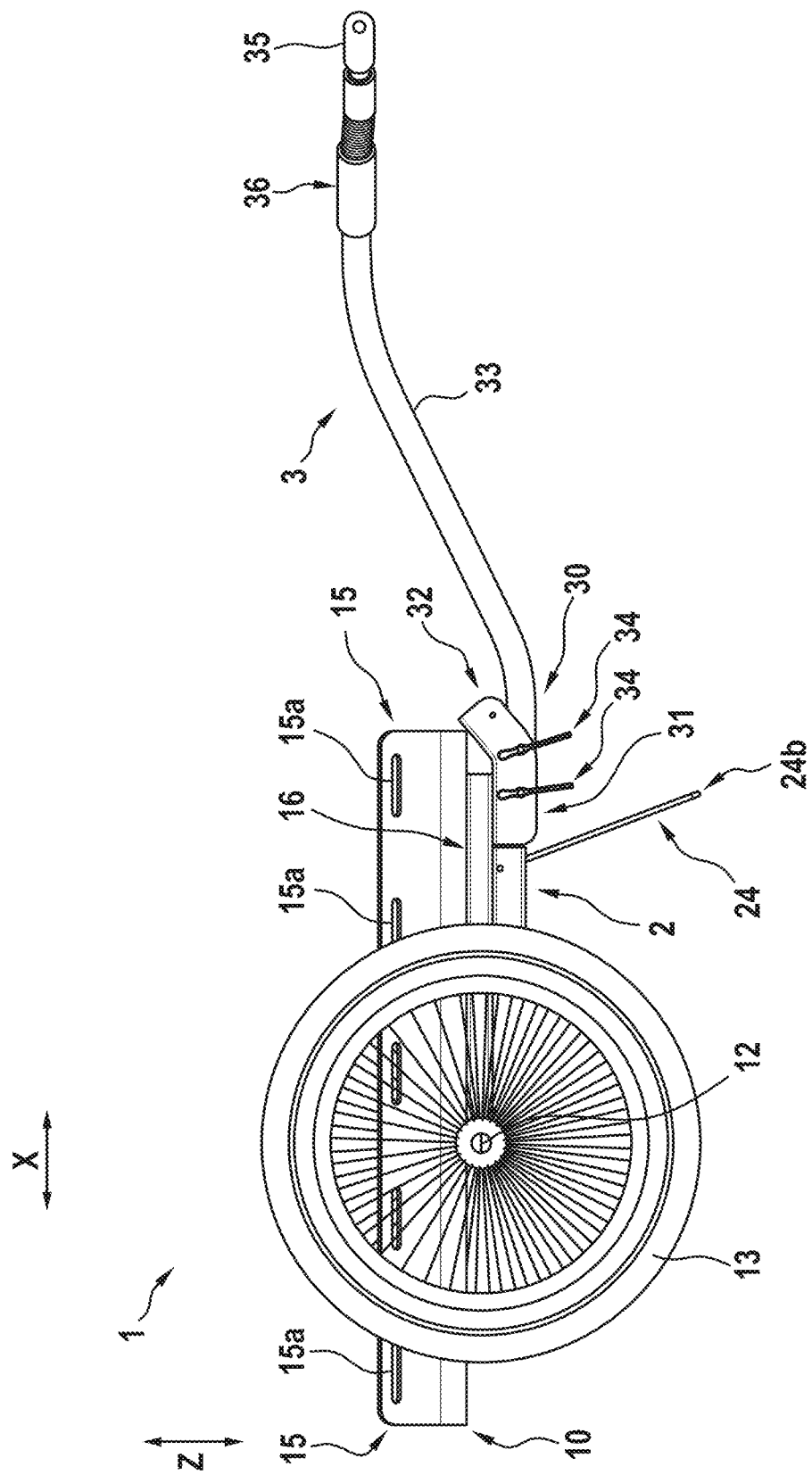
FIG. 3 is a lateral schematic representation of the cart of FIG. 1 from the right.
Figure 4:
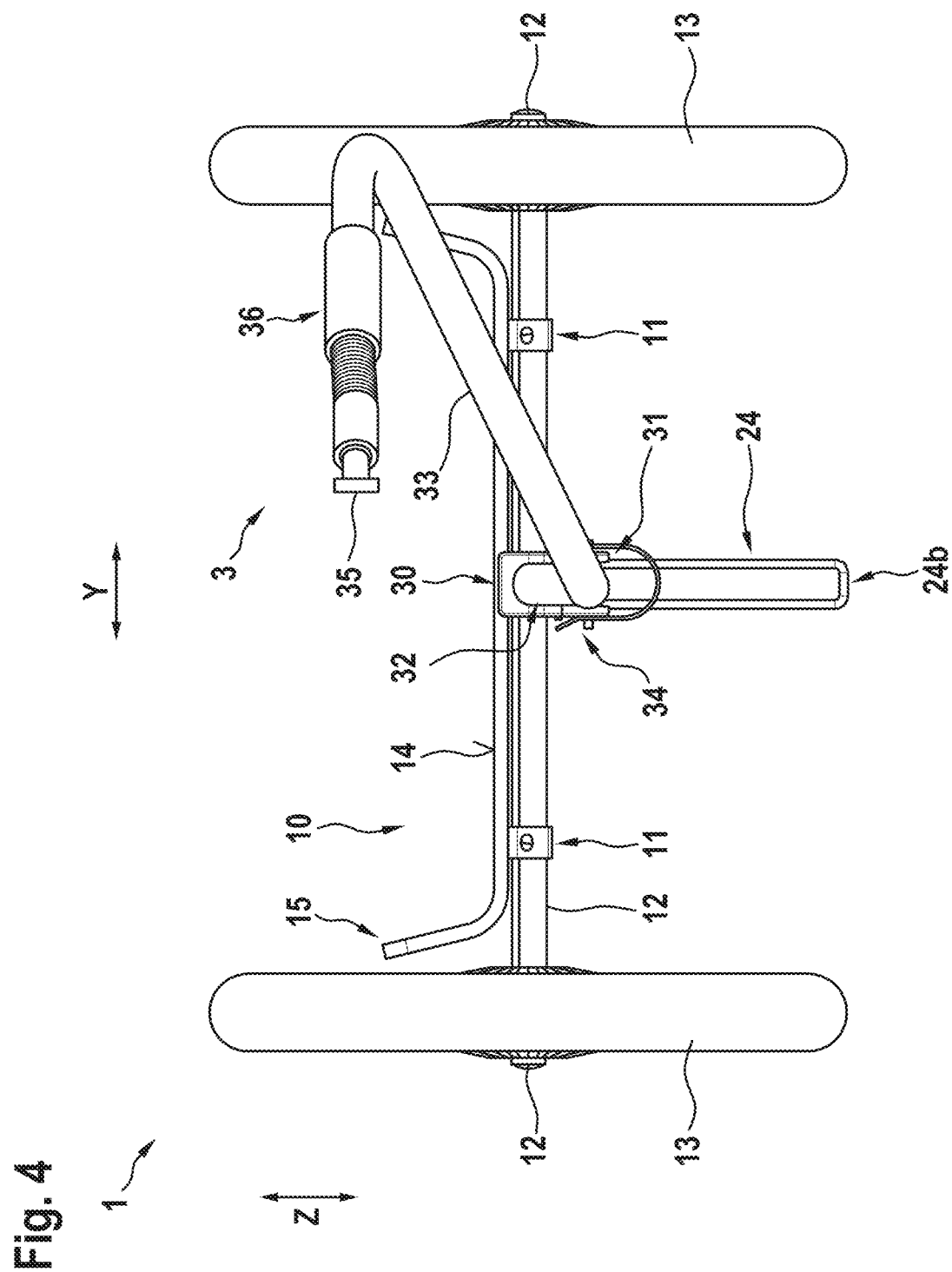
FIG. 4 is a schematic representation of the cart of FIG. 1 from the front.
Figure 5:
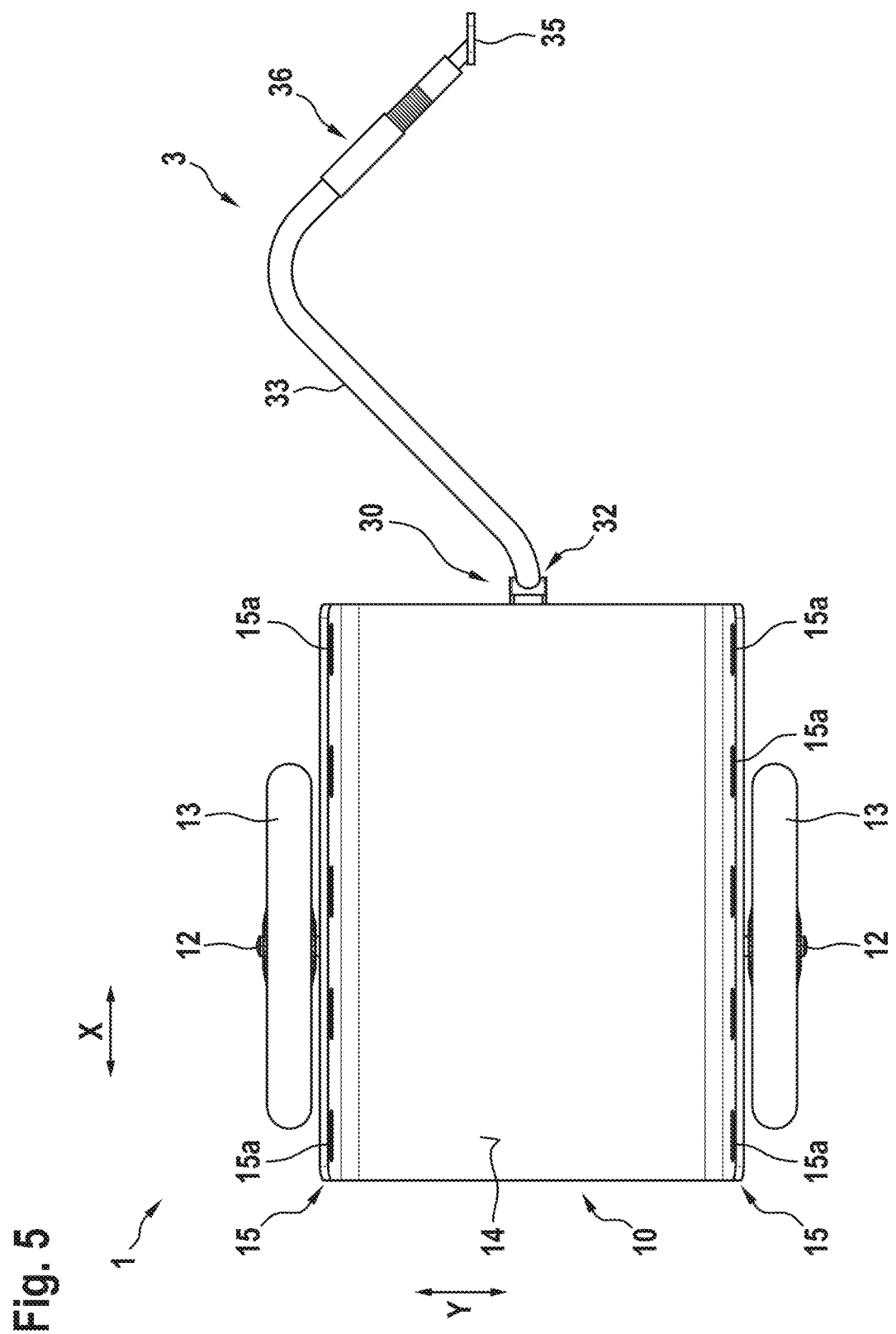
FIG. 5 is a schematic representation of the cart of FIG. 1 from above.
Figure 6:
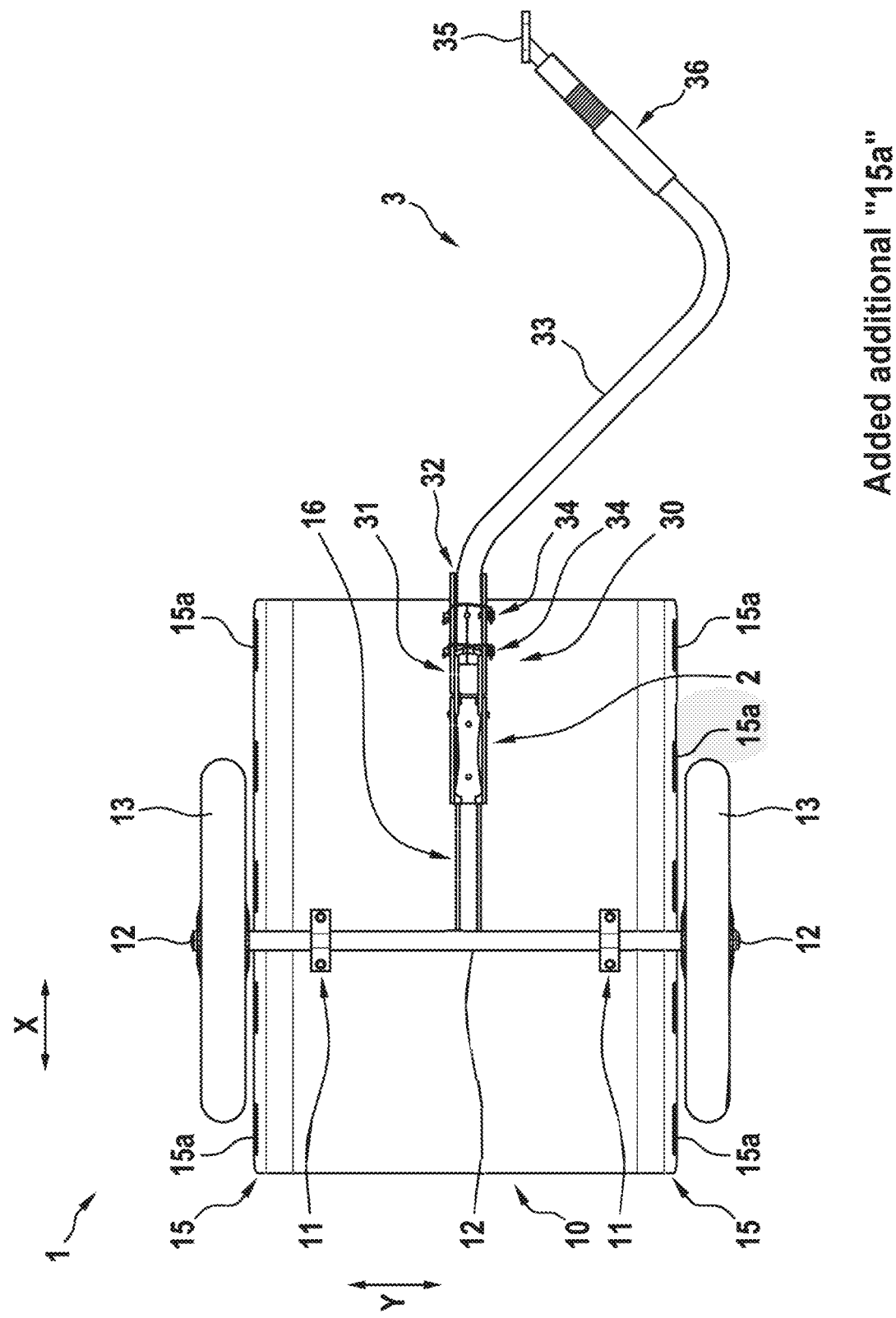
FIG. 6 is a schematic representation of the cart of FIG. 1 from below.
Figure 7:
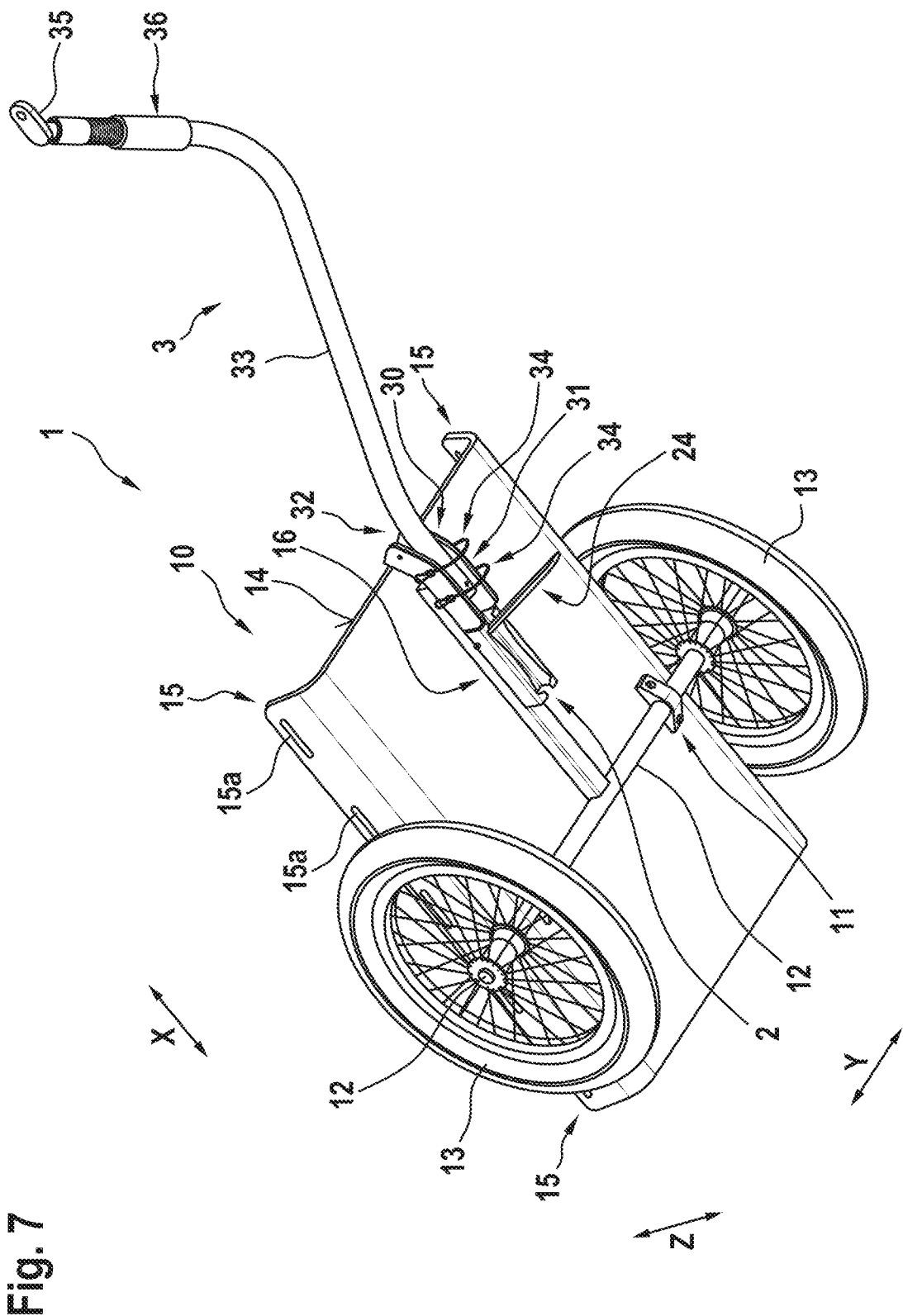
FIG. 7 is a further perspective schematic representation of the cart of FIG. 1.
Figure 8:
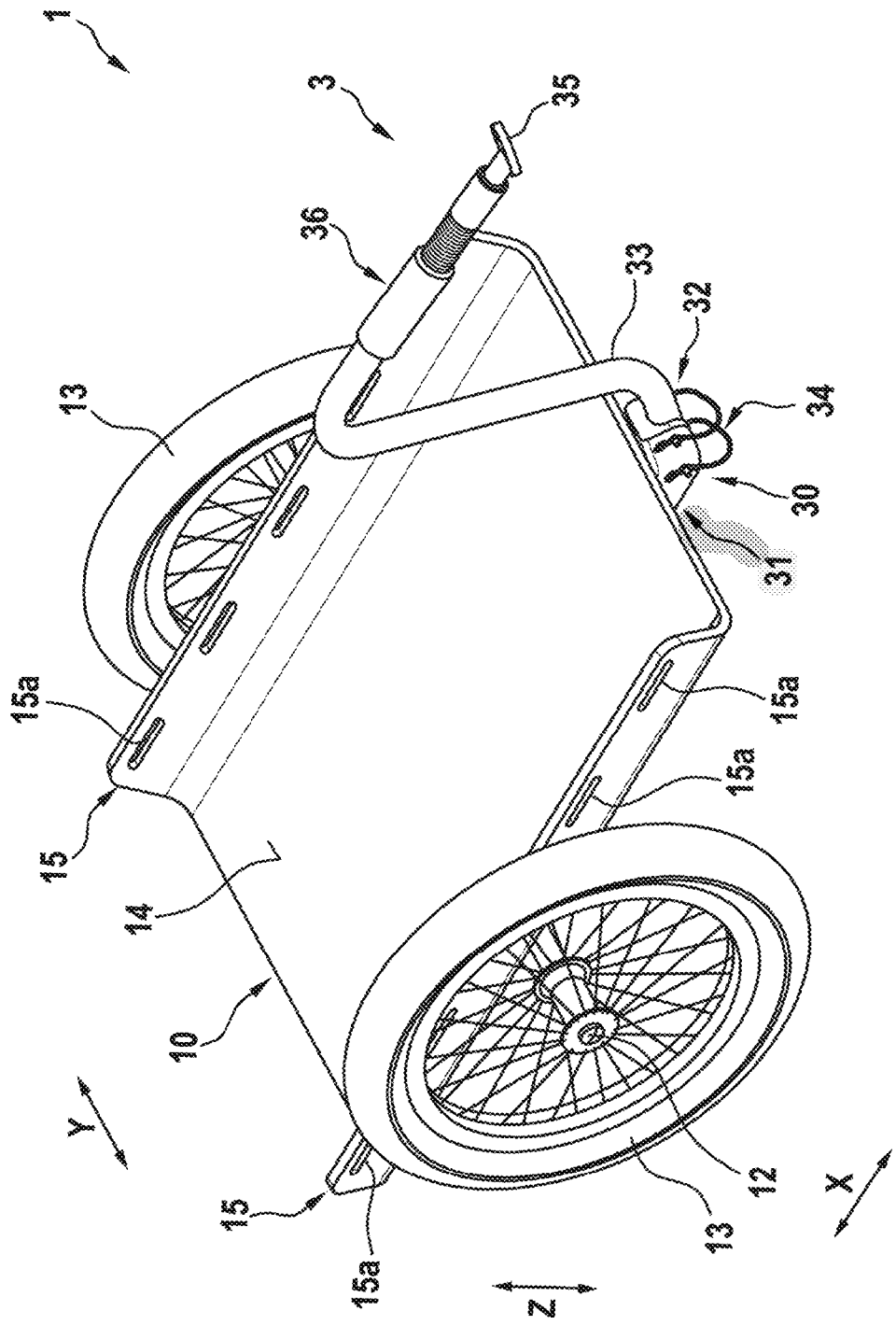
FIG. 8 is a perspective schematic representation of the cart in a second position as a handcart.
Figure 9:
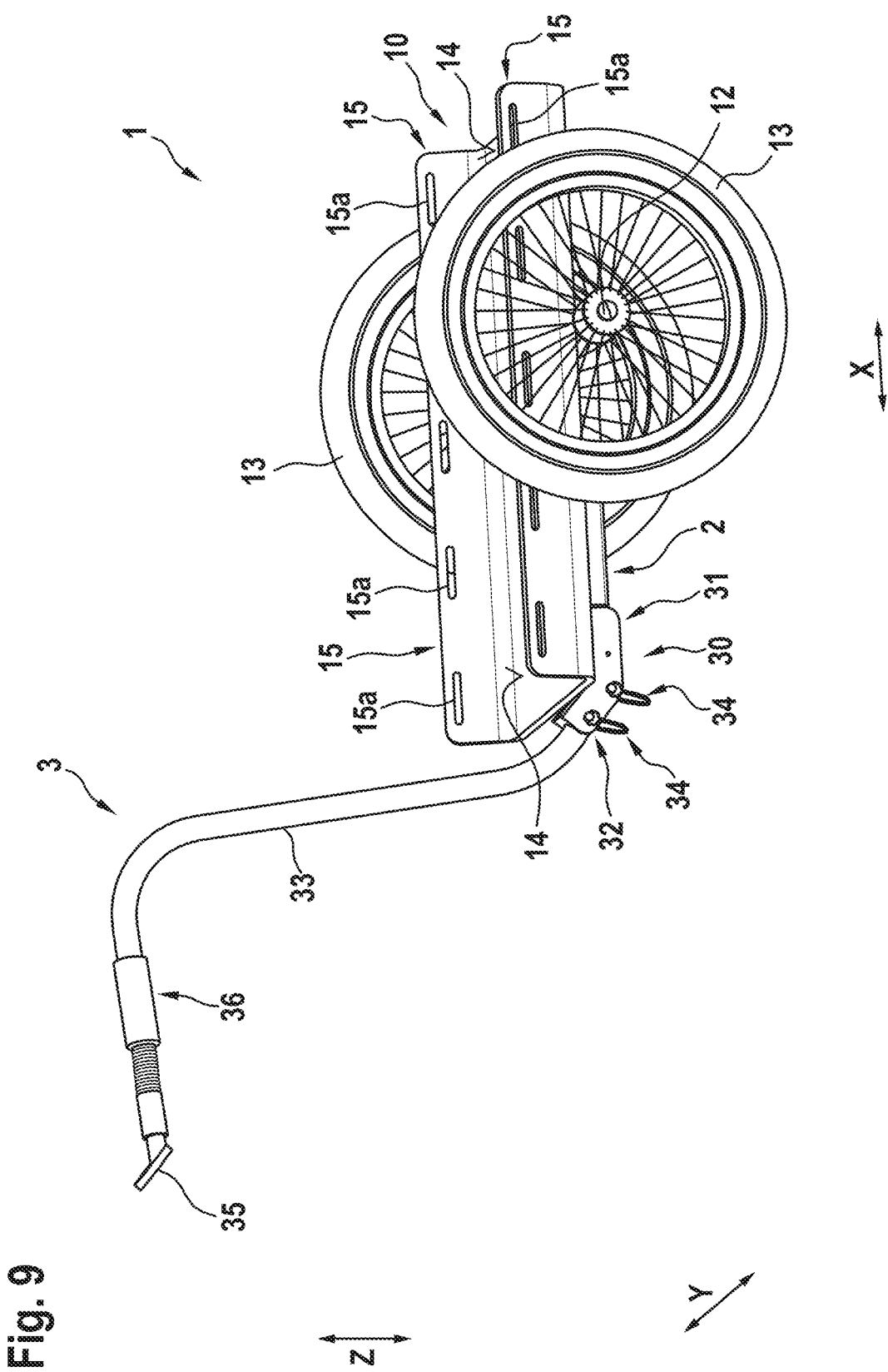
FIG. 9 is a further perspective schematic representation of the cart of FIG. 8.
Figure 10:
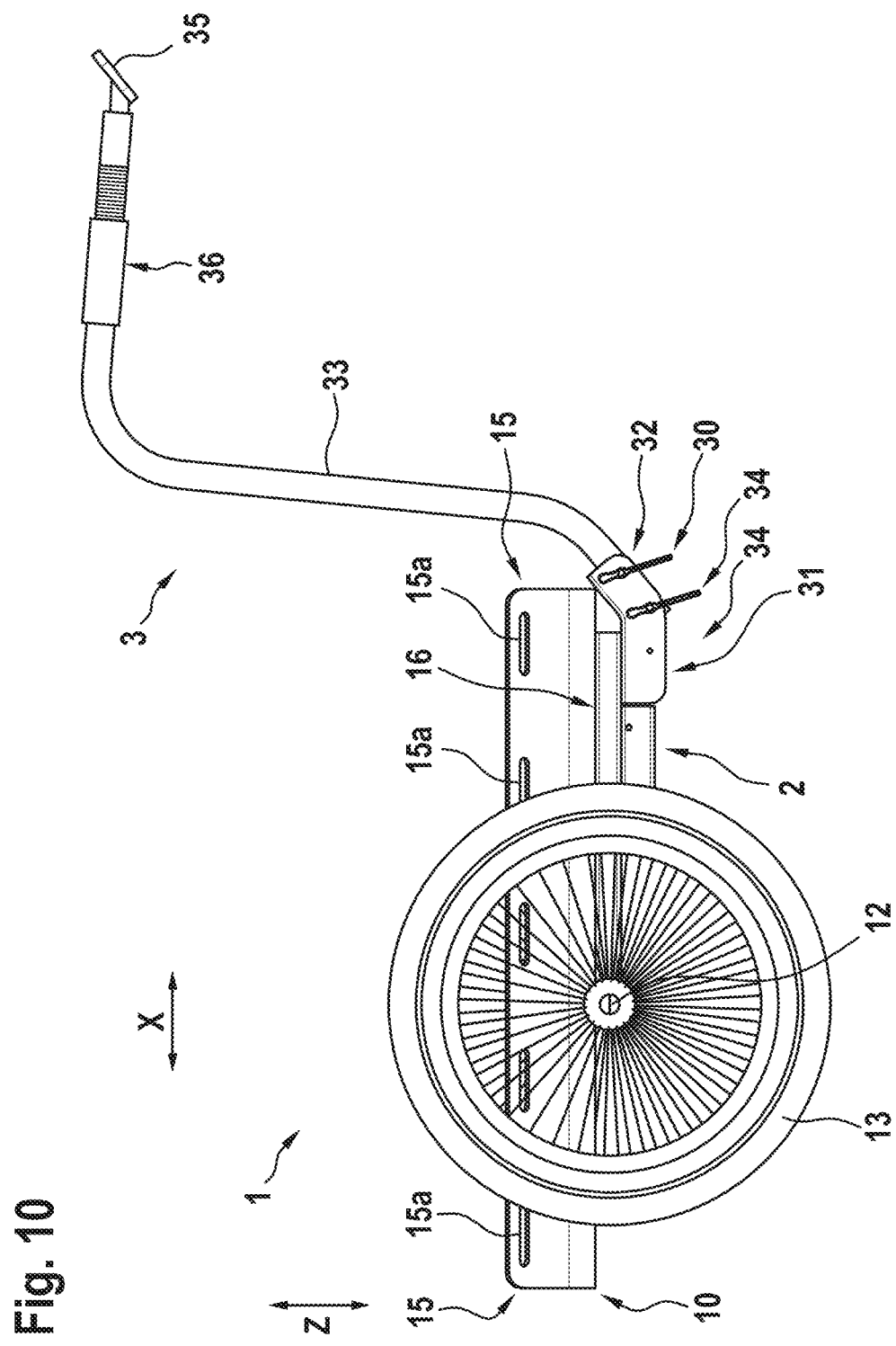
FIG. 10 is a lateral schematic representation of the cart of FIG. 8 from the right.
Figure 11:
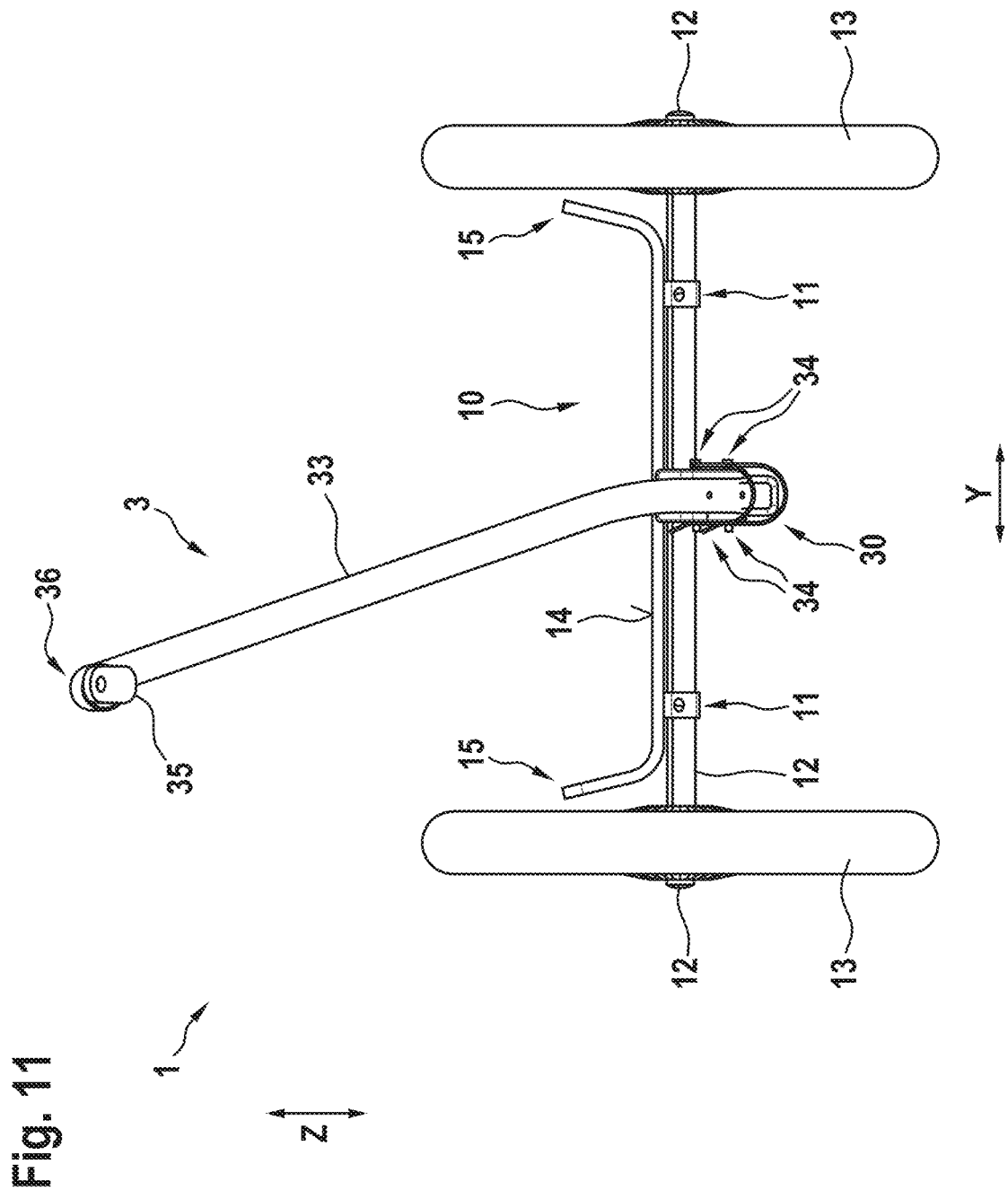
FIG. 11 is a schematic representation of the cart of FIG. 8 from the front.

The above figures are viewed in Cartesian coordinates. A longitudinal direction X is shown, which may also be referred to as the depth X or the length X. A transverse direction Y, which may also be referred to as the width Y, extends perpendicular to the longitudinal direction X. A vertical direction 2, which may also be referred to as the height Z, extends perpendicular to both the longitudinal direction X and the transverse direction Y. The longitudinal direction X and the transverse direction Y together form the horizontal X, Y, which may also be referred to as the horizontal plane X, Y.

A cart 1 according to the invention which can be used as a bicycle trailer 1 is shown in FIGS. 1 to 7. The cart 1 according to the invention which can be used as a handcart 1 is shown in FIG. 8 to 11, The cart 1 has a frame 10, which may also be referred to as a framework 10 or a support structure 10.

The frame 10 includes a loading surface 14 which is U-shaped in the transverse direction Y and which can be formed in one piece from a wooden board in a particularly simple, cost-effective manner and at the same time is visually appealing to a user. In the embodiment under consideration, the loading surface 14 has edges 15 which are bent upwards at the side and which delimit the loading surface 14 in the transverse direction Y and project upwards in the vertical direction Z. In this way, loads (not shown) which are to be transported on the loading surface 14 can be held in the transverse direction Y. The curved edges 15 each have five slot-like through-openings 15a as holders 15a, each extending lengthwise in the longitudinal direction X. Ropes, straps, belts and the like, for example, can be passed through these through-openings 15a in order to be able to secure the loads arranged on the loading surface 14. In the longitudinal direction X to the front and to the rear, the loading surface 14 is designed to be open, which can facilitate loading and unloading.

On the underside of the loading surface 14, two axle bearings 11 are arranged in such a way that in the transverse direction Y an axle 12 can be held rotatably by the two axle bearings 11 of the frame 10. A wheel 13 is fixedly arranged on each side of the axle 12. As a result, the frame 10 can be rolled relative to the ground (not shown) by means of the wheels 13 and axle 12.

On the underside of the loading surface 14, a support rail 16 is also arranged fixedly in front of the axle 12 and extends in the longitudinal direction X. The support rail 16 extends almost to the front edge of the loading surface 14. In the vertical direction from below, a fold-out stand 2 is fixedly arranged facing the axle 12 on the support rail 16 and a drawbar holder 30 of a folding drawbar 3 is arranged fixedly facing away from the axle 12 on the support rail.

Figure 13:
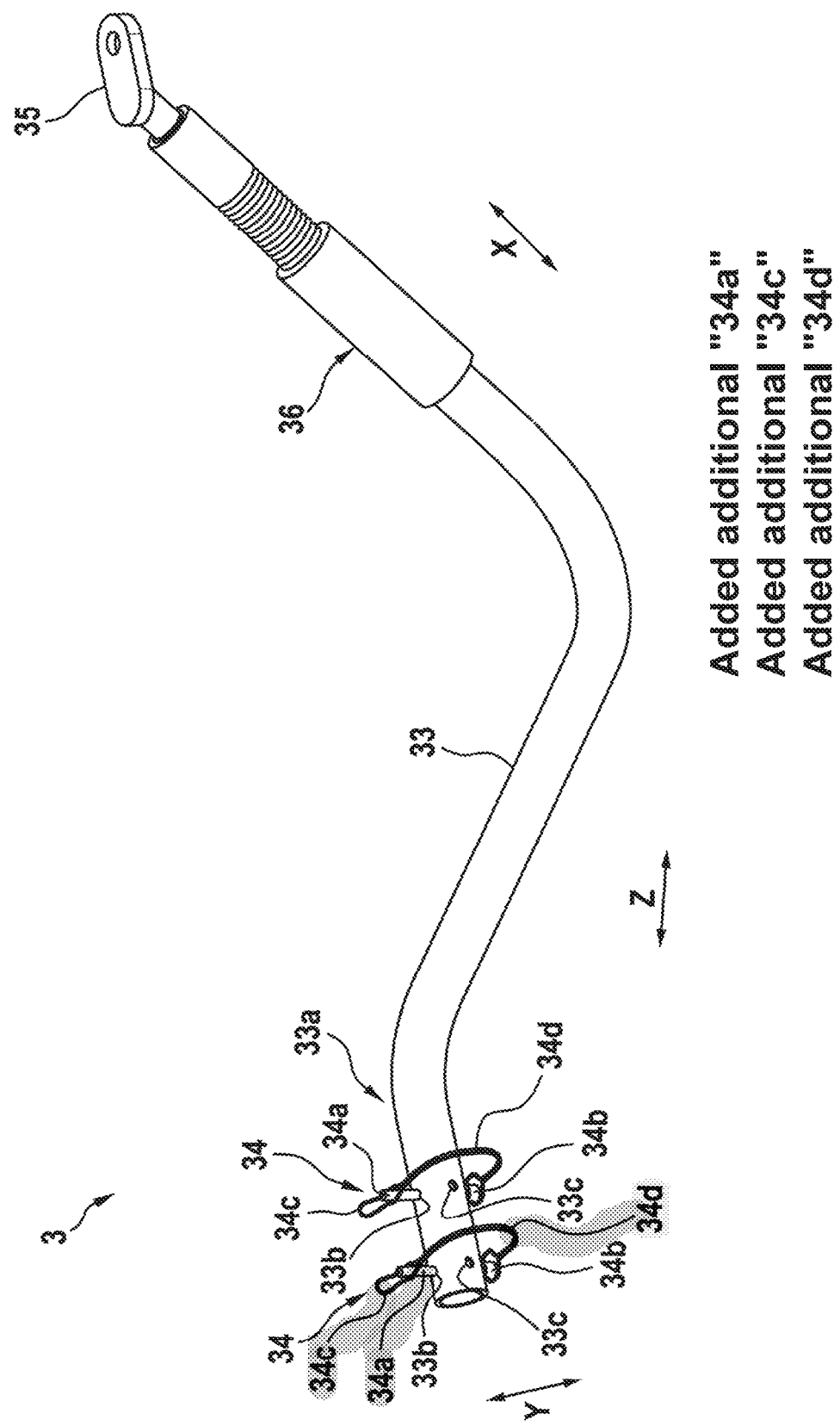
FIG. 13 is a perspective schematic representation of a drawbar body.

The usability of the cart 1 as a bicycle trailer 1 or as a handcart 1 can be achieved by the orientation and arrangement of a drawbar body 33 of the folding drawbar 3. For example, as shown in perspective in FIG. 13, the drawbar body 33 has a curved course which allows the drawbar body 33 to be held fixedly in its first position, oriented substantially in the horizontal X, Y with a fastening region 33a of the drawbar body 33 from a horizontal receiving region 31 of the drawbar holder 30, see, for example, FIGS. 14 and 15, and to be fastened as a low drawbar to the side of the hub of the rear wheel of a bicycle (not shown) by means of a coupling element 35 in the form of a bicycle trailer coupling 35.

Figure 14:
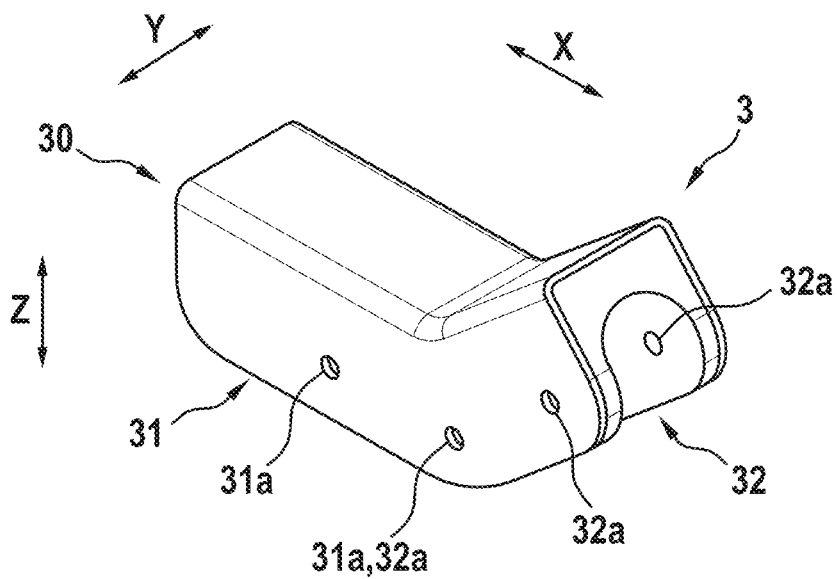
FIG. 14 is a perspective schematic representation of a drawbar holder.
Figure 15:
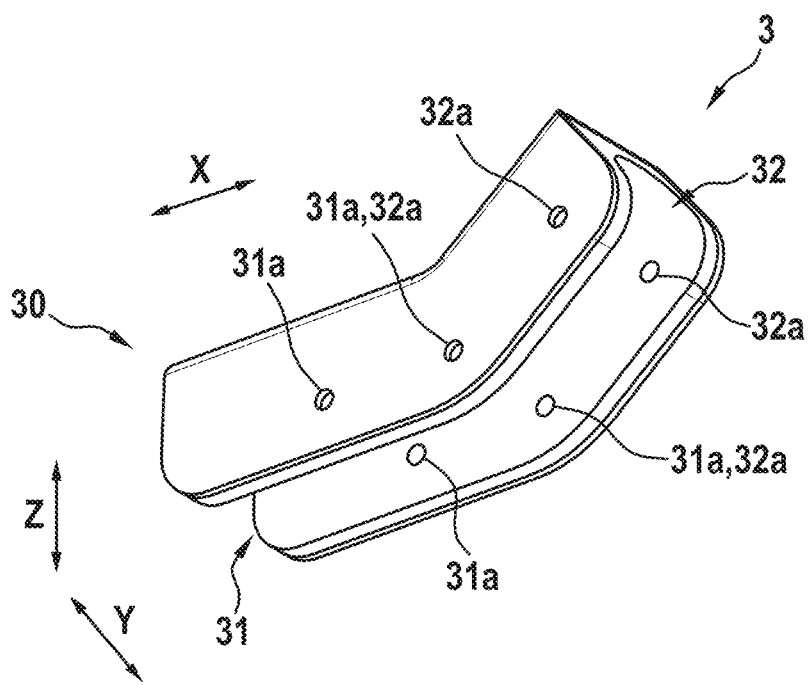
FIG. 15 is a further perspective schematic representation of the drawbar holder.
Figure 16:
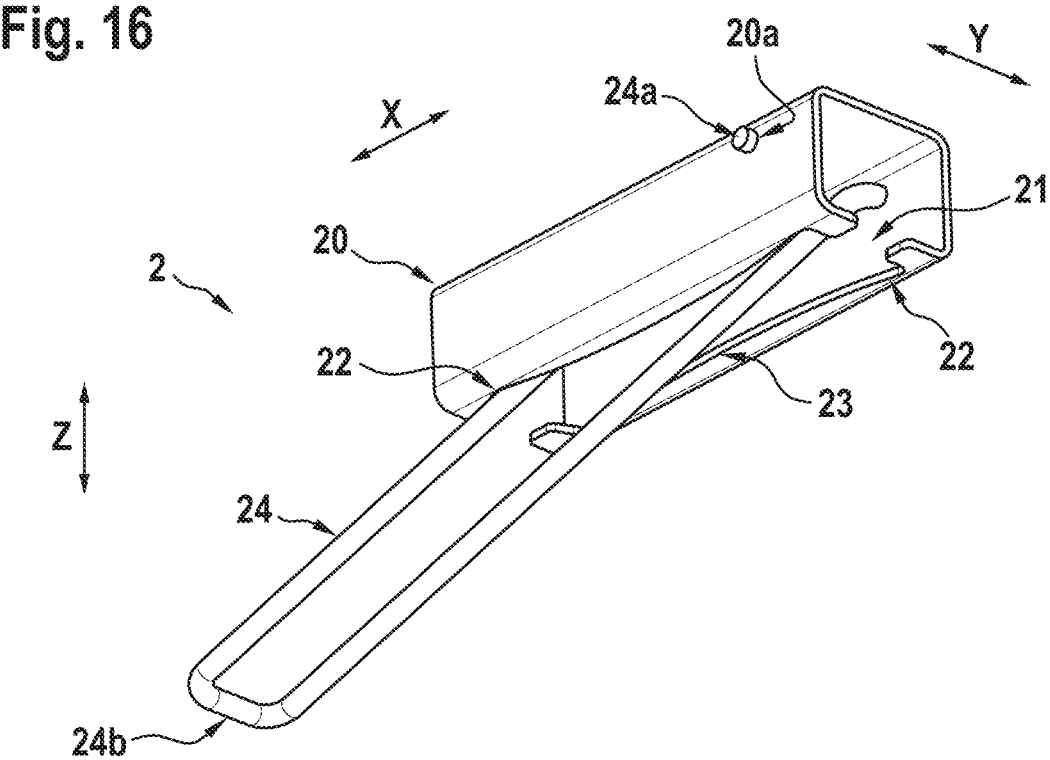
Figure 17:
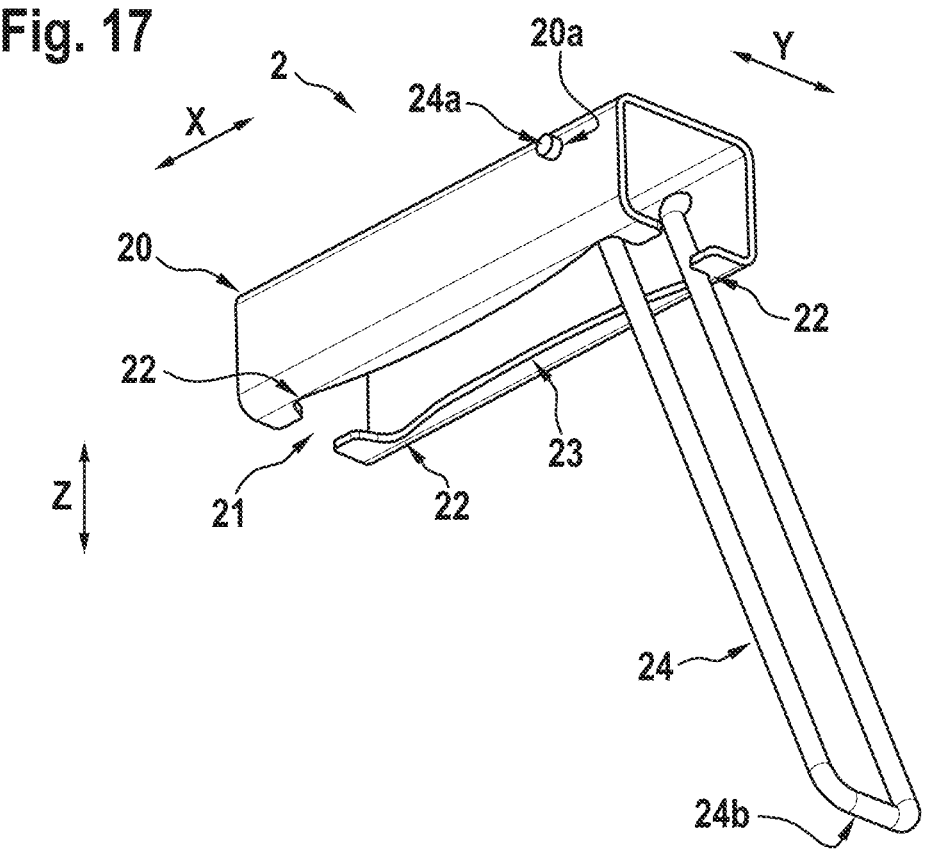
FIG. 17 is a perspective schematic representation of the fold-out stand with the stand element folded out.
Figure 18:
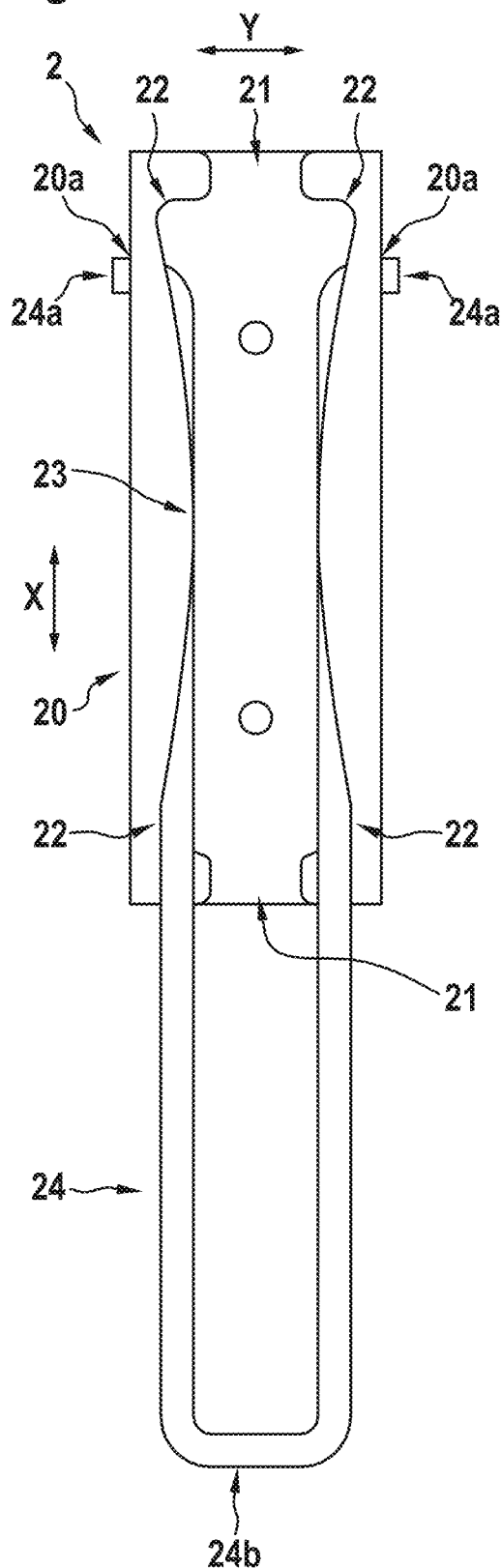
FIG. 18 is the schematic representation of FIG. 16 from below.
Figure 19:
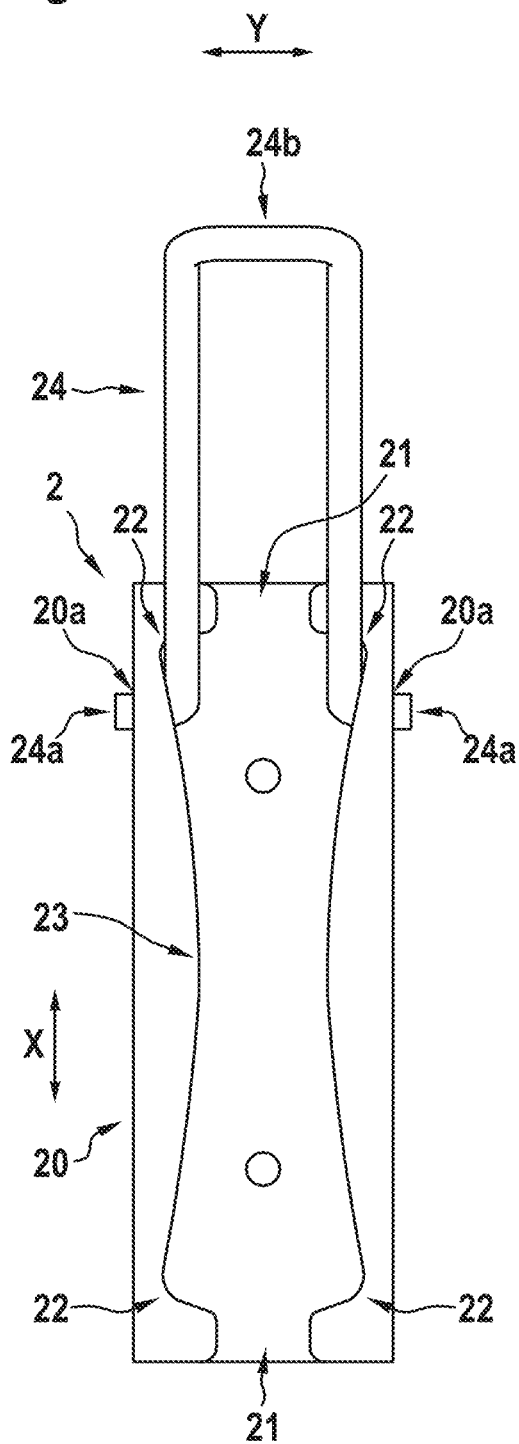
FIG. 19 is the schematic representation of FIG. 17 from below.
Figure 20:
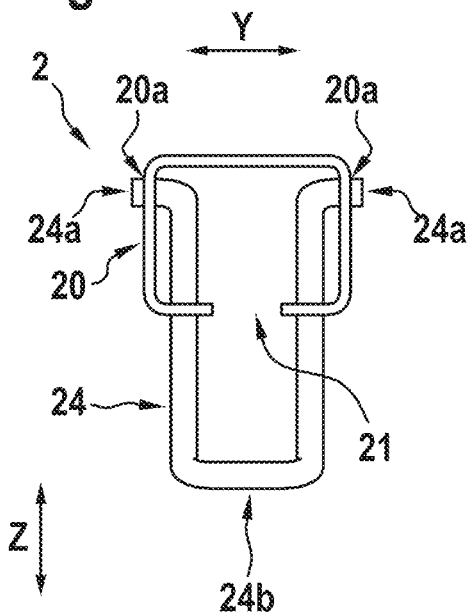
FIG. 20 is the schematic representation of FIG. 16 from the front.
Figure 21:
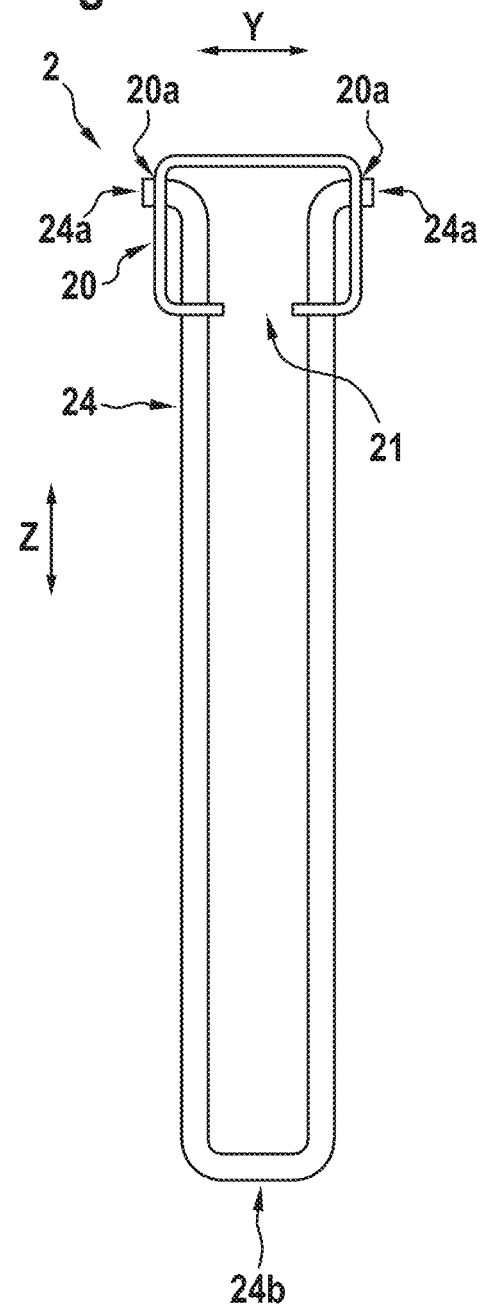
FIG. 21 is the schematic representation of FIG. 17 from the front.
Figure 22:
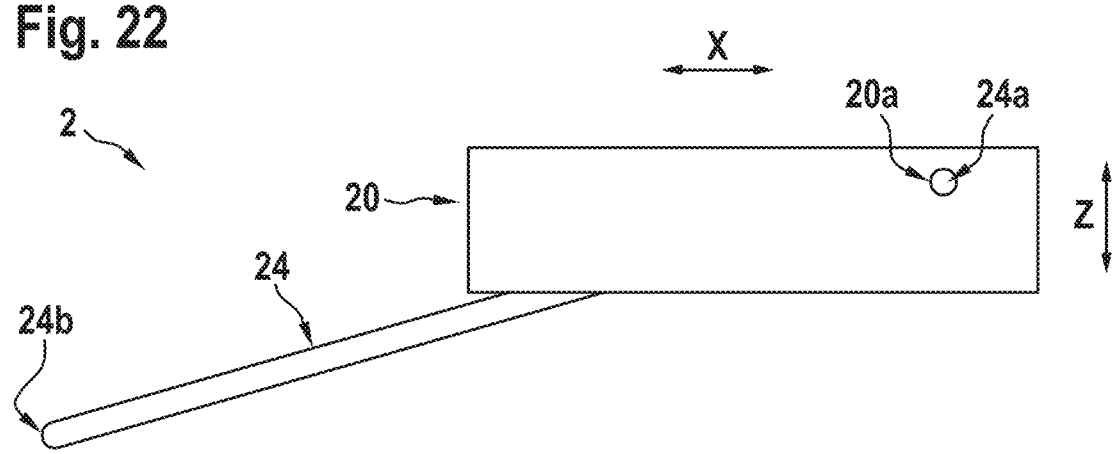
FIG. 22 is the schematic representation of FIG. 16 from the right.
Figure 23:
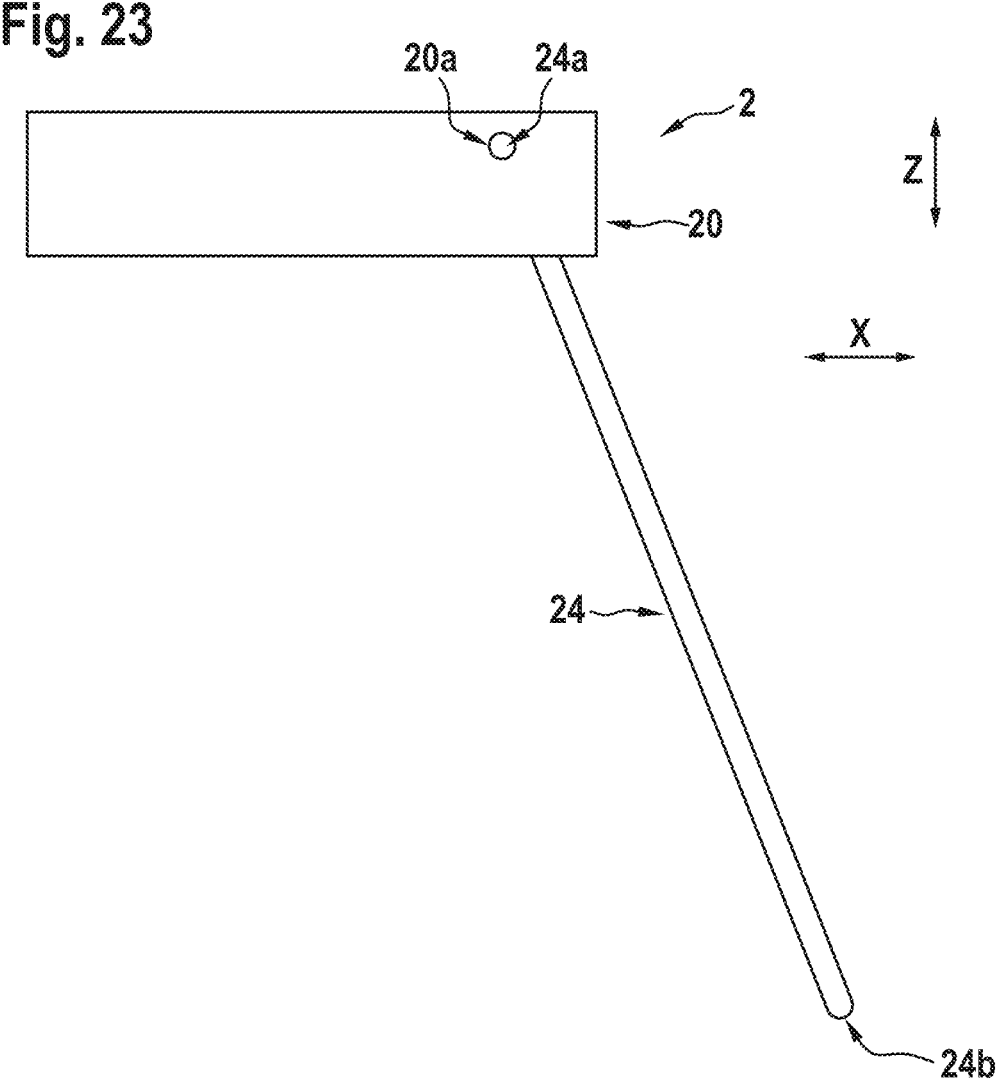
FIG. 23 is the schematic representation of FIG. 17 from the right.

If the drawbar body 33 is rotated by approximately 90° and the fastening region 33a of the drawbar body 33 is held fixedly by an oblique receiving region 32 of the drawbar holder 30, see for example FIGS. 14 and 15, the drawbar body 33 extends in the transverse direction Y centrally and in the longitudinal direction X and in the vertical direction Z extends forwards and upwards in such a way that a grip region 36 of the drawbar body 33 near the bicycle trailer coupling 36 can easily be reached by one hand of the user in order to pull or to push the cart 1 as a handcart 1 in the longitudinal direction X. Overall, the drawbar body 33 is designed as a cylindrical tube, which can enable high stability at low manufacturing costs. This can also make the grip region 36 easy for the user to grasp.

The fastening region 33a of the drawbar body 33 has a total of four pairs of diametrically opposing through-openings 33b, 33c. Two pairs are each arranged offset from one another by approximately 90° and are offset from the other two pairs in the longitudinal direction of extension of the fastening region 33a of the drawbar body 33.

Two pairs of horizontal through-openings 33b of the fastening region 33a of the drawbar body 33 are designed to be connected to the drawbar holder 30 when the drawbar body 33 is oriented substantially horizontally. Then the fastening region 33a of the drawbar body 33 is arranged in the horizontal receiving region 31 of the drawbar holder 30, which is semicircular and in turn has two pairs of diametrically opposing through-openings 31a which correspond in design and arrangement to the horizontal through-openings 33b of the fastening region 33a of the drawbar body 33.

If the horizontal through-openings 33b of the fastening region 33a of the drawbar body 33 have been brought into congruence with the through-openings 31a of the horizontal receiving region 31 of the drawbar holder 30 by the user by rotation about the axis of the longitudinal direction X and by positioning along the longitudinal direction X, two connecting elements 34 can be pushed by the user through the overlapping through-openings 31a, 33b. A bolt 34a of the relevant connecting element 34 can then be pushed through the overlapping through-openings 31a, 33b until the bolt 34a rests with its bolt head 34h against the drawbar holder 30 from the outside. The opposite end of the bolt 34a can be secured in each case by means of a clamping element 34c, so that the bolt 34a can be fixed in the overlapping through-openings 31a, 33b. The clamping element 34c is in each case connected in an arcuate manner to the bolt head 34b by means of a securing device 34d, for example in the form of a metal band, so that each connecting element 34 is made in one piece and can thus be used more easily by the user.

In the horizontal receiving region 31 of the drawbar holder 30 which is held as described above, the drawbar body 33 is in its first position. The coupling element 35 of the drawbar body 33 can now be connected by the user to the corresponding holder of the hub of the bicycle and thus the cart 1 can be used as a bicycle trailer 1, see, for example, FIGS. 1 to 7.

If instead the cart 1 is to be used as a handcart 1, the user can remove the clamping elements 34c from the bolts 34a and can pull the two connecting elements 34 out of the overlapping through-openings 31a, 33b with one hand. With the other hand, the user can hold the now loose drawbar body 33. For this purpose, the cart 1 may, if necessary, have been set up on its rear edge in order to facilitate access to the drawbar holder 30 on the underside of the frame 10 and to position the carriage 1 in a stable manner.

The user can now turn the drawbar body 33 by 90° in such a way that the grip region 36 of the drawbar body 33 points upward in the vertical direction Z. In this orientation, the user can insert the fastening region 33a of the drawbar body 33 into the oblique receiving region 32 of the drawbar holder 30 so that the cylindrical fastening region 33a of the drawbar body 33 rests against the semicircular receiving region 32 of the drawbar holder 30. The two pairs of vertical through-openings 33c of the fastening region 33a of the drawbar body 33 are to be brought into congruence with two corresponding pairs of through-openings 32a of the oblique receiving region 32 of the drawbar holder 30. The lower pair of through-openings 32a of the oblique receiving region 32 of the drawbar holder 30 in the vertical direction Z forms the front pair of through-openings 31a of the horizontal receiving region 31 of the drawbar holder 30, i.e., the lower pair of through-openings 32a of the oblique receiving region 32 of the drawbar holder 30 can be used in any position of the drawbar body 33.

In this arrangement of the overlapping through-openings 32a, 33c, the drawbar body 33 can be connected again to the drawbar holder 30 by the two connecting elements 34 as described above. In the vertical receiving region 32 of the drawbar holder 30, held as described above, the drawbar body 33 is in its second position. The grip region 36 of the drawbar body 33 can now be gripped by the user and the cart 1 can thus be used as a handcart 1, see, for example, FIGS. 8 to 11.

Figure 12:
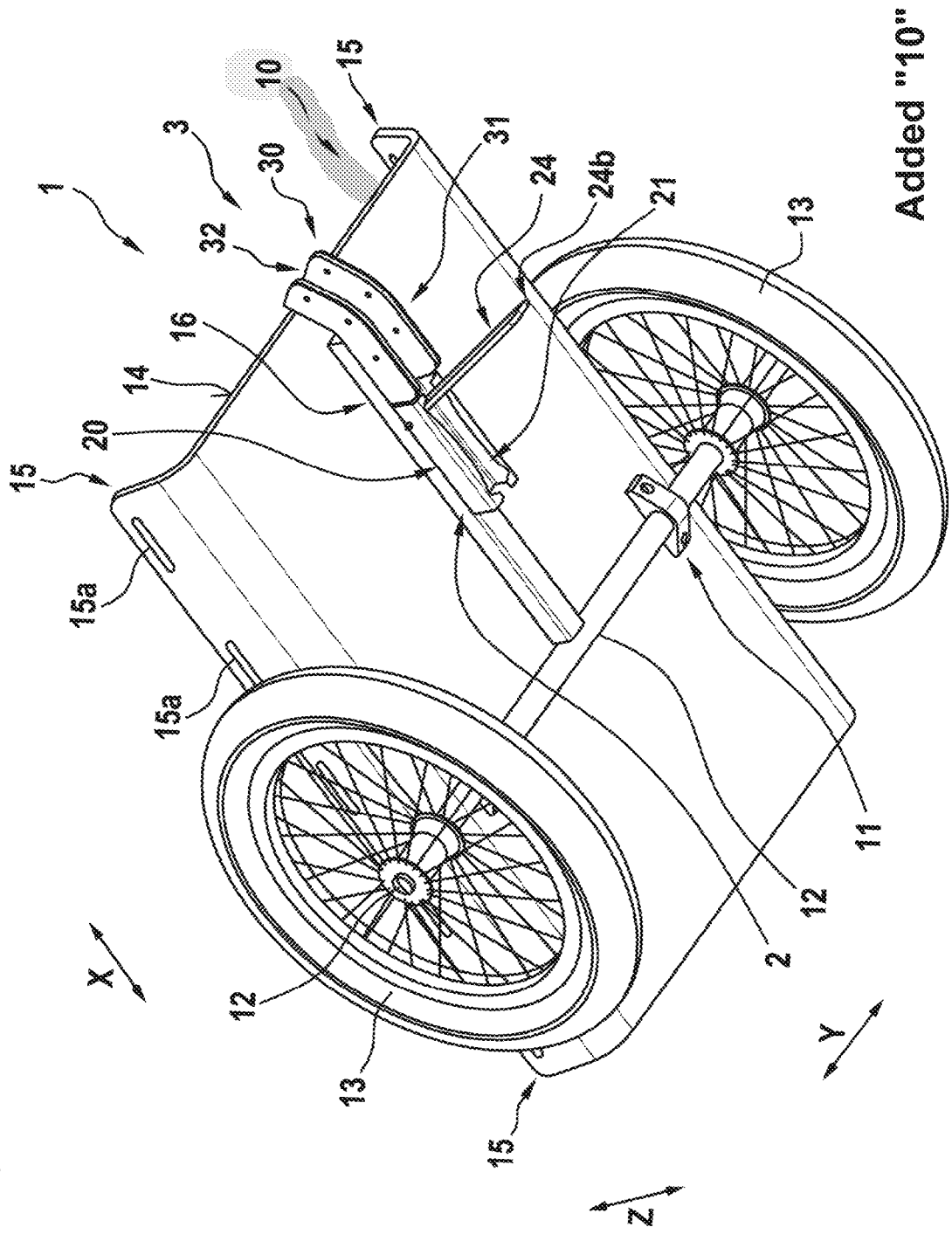
FIG. 12 is the schematic representation of FIG. 7 without the drawbar body.

In order to be able to park the cart 1 both as a bicycle trailer 1, especially when it is not connected to a bicycle, and as a handcart 1 on the ground, the cart 1 has the aforementioned fold-out stand 2, which in the vertical direction Z is arranged below the frame 10 and in the longitudinal direction X is arranged behind the drawbar holder 30 and in front of the axle 12, see, for example, FIG. 12.

The fold-out stand 2 has a stand holder 20 which is box-shaped or cuboid and extends substantially in the longitudinal direction X, see, for example, FIGS. 16 to 23. The stand holder 20 is screwed onto the support rail 16 of the frame 10. The stand holder 20 is designed to be open on both sides in the longitudinal direction X and has on its underside a recess 21 which extends continuously in the longitudinal direction X. This allows the stand holder 20 to be manufactured as a bent sheet metal part, which can keep the manufacturing effort low. In the longitudinal direction X, the recess 21 has recess ends 22 which in each case are formed by two hook-like projections directed towards one another in the transverse direction X. In the longitudinal direction X, centrally between the two recess ends 22, the recess 21 narrows in an arcuate shape to form a recess constriction 23.

The fold-out stand 2 also includes a stand element 24 in the form of a stand bracket 24, which is bracket-shaped and open on one side. The two open ends 24a of the open side of the stand element 24 are directed outward at right angles and each engage in a through-opening 20a of the stand holder 20 in which the stand element 24 is rotatably mounted. The closed end 24b is designed to run straight in the transverse direction A and serves to support the cart 1 on the ground.

The stand element 24 can now be moved back and forth between the two recess ends 22 by the user by hand. Due to its design that is open on one side, the stand element 24 can be resiliently pressed in by the recess constriction 23 in the transverse direction Y and thus guided away in both directions along the longitudinal axis X over the recess constriction 23 by the user. As a result, the recess constriction 23 can also exert pressure on the stand element 24 in order to bring about or at least to support a movement of the stand element 24 in the longitudinal direction X towards each of the two recess ends 22.

If the stand element 24 is guided backward by the user in the longitudinal direction X, the stand element 24 comes to rest against the corresponding recess end 22. Due to the positioning of the through-openings 20a of the stand holder 20 in the longitudinal direction X clearly in front of the recess constriction 23 and near the support rail 16 in the vertical direction Z, the closed end 24b of the stand element 24 can be spaced from the ground and the stand element 24 can be folded in thereby.

If the stand element 24 is now moved forward in the longitudinal direction X by the user, the stand element 24 comes to rest against the corresponding opposing recess end 22. Due to the positioning of the through-openings 20a of the stand holder 20 in the longitudinal direction X significantly hi front of the recess constriction 23 and near the support rail 16 in the vertical direction Z, the closed end 24b of the stand element 24 in this folded-out state can point significantly further to the ground in the vertical direction Z and can be placed on the ground. This allows the cart 1 to be parked on the ground.

REFERENCE LIST (PART OF THE DESCRIPTION)

X longitudinal direction; depth; length
Y transverse direction; width
Z vertical direction; height
X, Y horizontal; horizontal plane
1 cart; bicycle trailer; handcart
10 frame; framework; support structure
11 axle bearing
12 axle
13 wheels
14 loading surface
15 edges of the loading surface 14
15a holders or through-openings of the edges 15
16 support rail
2 fold-out stand
20 stand holder
20a through-openings of the stand holder 20; articulation points of the stand holder 20
21 recess
22 recess ends
23 recess constriction
24 stand element; stand bracket
24a open ends of the stand element 24
24b closed end of the stand element 24
3 folding drawbar
30 drawbar holder
1 horizontal receiving region
31a through-openings of the horizontal receiving region 31 of the drawbar holder 30
32 oblique receiving region
32a through-openings of the oblique receiving region 32 of the drawbar holder 30
33 drawbar body
33a fastening region of the drawbar body 33
33b horizontal through-openings of the fastening region 33a of the drawbar body 33
33c vertical through-openings of the fastening region 33a of the drawbar body 33
34 connecting elements 34a bolt
34b bolt heads
34c clamping elements
34d securing device
35 coupling element; bicycle trailer coupling
36 grip region

The invention claimed is:

1. A cart for use as a bicycle trailer or as a handcart
with a frame
with a pair of wheels and
with a loading surface and
with a foldable drawbar with a drawbar body which is designed to be connected to a bicycle in a first position and to be guided by a user's hand in a second position, characterized in that
the foldable drawbar has a drawbar holder arranged on the frame,
wherein the drawbar holder is designed to receive the drawbar body in the first position and in the second position; and
wherein the drawbar holder has at least one pair of through-openings which, in the second position of the drawbar body, are designed to be connected by means of a connecting element to a pair of vertical through-openings in the drawbar body.

2. The cart according to claim 1, characterized in that
the drawbar holder is designed to receive the drawbar body in the first position at least substantially horizontally (X, Y) and in the second position obliquely with respect to the horizontal (X, Y) pointing upwards in the vertical direction (Z).

3. The cart according to claim 1, characterized in that the connecting element is designed to secure itself.

4. The cart according to claim 1, characterized in that
the loading surface has laterally in the transverse direction (Y) in each case an edge protruding upward in the vertical direction (Z).

5. The cart according to claim 1, characterized in that
the drawbar body has a coupling element at its end facing away from the frame, which coupling element is designed to be connected to a bicycle in the first position of the drawbar body.

6. The cart according to claim 1, characterized in that
the drawbar body has, in the region of its end facing away from the frame, a grip region which is designed to be gripped by one hand of a user in the second position of the drawbar body.

7. The cart according to claim 1, wherein the at least one pair of through-openings of the drawbar holder are in an oblique receiving region of the drawbar holder, and wherein the pair of vertical through-openings in the drawbar body are in a fastening region of the drawbar body.

8. A cart for use as a bicycle trailer or as a handcart
with a frame
with a pair of wheels and
with a loading surface and
with a foldable drawbar with a drawbar body which is designed to be connected to a bicycle in a first position and to be guided by a user's hand in a second position, characterized in that
the foldable drawbar has a drawbar holder arranged on the frame,
wherein the drawbar holder is designed to receive the drawbar body in the first position and in the second position; and
wherein the drawbar holder has at least one pair of through-openings which, in the first position of the drawbar body, are designed to be connected by means of a connecting element to a pair of horizontal through-openings in the drawbar body, and,
in the second position of the drawbar body, are designed to be connected by means of a connecting element to a pair of vertical through-openings in the drawbar body.

9. The cart according to claim 8, wherein the pair of horizontal through-openings in the drawbar body are in a fastening region of the drawbar body, and wherein the pair of vertical through-openings in the drawbar body are in a fastening region of the drawbar body.

10. The cart according to claim 8, characterized in that the drawbar holder is designed to receive the drawbar body in the first position at least substantially horizontally (X, Y) and in the second position obliquely with respect to the horizontal (X, Y) pointing upwards in the vertical direction (Z).

11. The cart according to claim 8, characterized in that the connecting element is designed to secure itself.

12. The cart according to claim 8, characterized in that the loading surface has laterally in the transverse direction (Y) in each case an edge protruding upward in the vertical direction (Z).

13. The cart according to claim 8, characterized in that the drawbar body has a coupling element at its end facing away from the frame, which coupling element is designed to be connected to a bicycle in the first position of the drawbar body.

14. The cart according to claim 8, characterized in that the drawbar body has, in the region of its end facing away from the frame, a grip region which is designed to be gripped by one hand of a user in the second position of the drawbar body.

15. A cart for use as a bicycle trailer or as a handcart
with a frame
with a pair of wheels and
with a loading surface and
with a fold-out stand,
characterized in that
the fold-out stand has
a stand holder, which is arranged on the frame, and
a stand element, which is held in a foldable manner by the stand holder,
the stand holder having a recess within which the stand element can be hinged between a folded state and an unfolded state.

16. The cart according to claim 15, characterized in that
the recess is delimited by two recess ends and
the recess has a recess constriction between the two recess ends.

17. The cart according to claim 15, characterized in that
the stand element is designed to deflect transversely to the folding direction when the stand element is folded between the folded-in state and the unfolded state.

18. The cart according to claim 15, characterized in that
the stand element has two open ends which each engage in a corresponding through-opening in the stand holder in such a way that the stand element is held rotatably in the through-openings in the stand holder.

19. The cart according to claim 15, characterized in that
the loading surface has laterally in the transverse direction (Y) in each case an edge protruding upward in the vertical direction (Z).

20. The cart according to claim 19, characterized in that
the edges of the loading surface each have at least one holder which is designed to be used to hold loads arranged on the loading surface.

21. The cart according to claim 15, characterized in that the drawbar body has a coupling element at its end facing away from the frame, which coupling element is designed to be connected to a bicycle in the first position of the drawbar body.

22. The cart according to claim 15, characterized in that the drawbar body has, in the region of its end facing away from the frame, a grip region which is designed to be gripped by one hand of a user in the second position of the drawbar body.

* * * * *